United States Patent
Grave et al.

(10) Patent No.: US 9,597,622 B2
(45) Date of Patent: Mar. 21, 2017

(54) SYSTEM AND METHODS FOR REMOVING ENTRAINED LIQUIDS

(71) Applicants: Edward J. Grave, Spring, TX (US); Andrew P. Steinhauser, Friendswood, TX (US)

(72) Inventors: Edward J. Grave, Spring, TX (US); Andrew P. Steinhauser, Friendswood, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 195 days.

(21) Appl. No.: 14/565,018

(22) Filed: Dec. 9, 2014

(65) Prior Publication Data
US 2015/0190744 A1   Jul. 9, 2015

Related U.S. Application Data

(60) Provisional application No. 61/925,075, filed on Jan. 8, 2014.

(51) Int. Cl.
*B01D 45/12* (2006.01)
*B04C 5/28* (2006.01)
(Continued)

(52) U.S. Cl.
CPC .............. *B01D 45/12* (2013.01); *B01D 1/305* (2013.01); *B01D 45/16* (2013.01); *B01D 47/14* (2013.01);
(Continued)

(58) Field of Classification Search
CPC ........ B01D 45/12; B01D 45/16; B01D 47/06; B01D 47/14; B01D 50/004; B04C 3/04; B04C 5/28
See application file for complete search history.

(56) References Cited

U.S. PATENT DOCUMENTS 3,010,537 A * 11/1961 Baker .................... B01D 46/10
                                                                55/323
4,349,360 A *  9/1982 Schuurmans .......... B01D 47/06
                                                                261/79.2
(Continued)

FOREIGN PATENT DOCUMENTS

WO    WO2013/154436    10/2013    ............ B01D 17/00

*Primary Examiner* — Robert Clemente
(74) *Attorney, Agent, or Firm* — ExxonMobil Upstream Research Company Law Department

(57) ABSTRACT

The present techniques are directed to a method for removing entrained liquid hydrocarbons in a countercurrent contact separator to produce a lean hydrocarbons gas. The method includes introducing a gas stream into an inlet of the countercurrent contact separator and flowing the gas stream through a bulk separator to capture a portion of the entrained liquid hydrocarbons. The method includes flowing the gas stream through a plurality of cyclone bundles, where the plurality of cyclone bundles are located in risers to capture a remaining fraction of the entrained liquid hydrocarbons. The method includes flowing the captured entrained liquids downward into a drain line countercurrent to the gas stream. The method includes removing the captured entrained liquids through a bottom outlet of the countercurrent contact separator. The method includes removing the lean hydrocarbons gas through a top outlet of the countercurrent contact separator.

11 Claims, 5 Drawing Sheets

(51) Int. Cl.
*B01D 47/14* (2006.01)
*B01D 50/00* (2006.01)
*B01D 45/16* (2006.01)
*B04C 3/04* (2006.01)
*C10L 3/10* (2006.01)
*B01D 1/30* (2006.01)

(52) U.S. Cl.
CPC ............. *B01D 50/004* (2013.01); *B04C 3/04* (2013.01); *B04C 5/28* (2013.01); *C10L 3/101* (2013.01)

(56) References Cited

U.S. PATENT DOCUMENTS

| | | | | |
|---|---|---|---|---|
| 4,767,424 | A * | 8/1988 | McEwan | B01D 50/002 55/329 |
| 4,783,204 | A * | 11/1988 | Roarty | B01D 45/16 122/34 |
| 7,279,020 | B2 | 10/2007 | Christiansen et al. | 55/338 |
| 7,316,733 | B1 * | 1/2008 | Hedrick | B01D 45/12 422/147 |
| 7,594,942 | B2 | 9/2009 | Polderman | 55/321 |
| 7,833,298 | B2 | 11/2010 | Larnholm | 55/337 |
| 8,025,706 | B2 | 9/2011 | Poorte | 55/346 |
| 2005/0060970 | A1 * | 3/2005 | Polderman | B01D 45/08 55/320 |
| 2005/0204917 | A1 * | 9/2005 | Haland | B01D 45/08 95/268 |
| 2012/0180661 | A1 * | 7/2012 | Di Berardo | B01D 45/04 95/258 |
| 2014/0182454 | A1 * | 7/2014 | Nieuwoudt | B01D 50/002 95/268 |

* cited by examiner

SYSTEM AND METHODS FOR REMOVING ENTRAINED LIQUIDS

CROSS REFERENCE TO RELATED APPLICATIONS

This application claims the priority benefit of U.S. Patent Application 61/925,075 filed Jan. 8, 2014 entitled SYSTEM AND METHODS FOR REMOVING ENTRAINED LIQUIDS, the entirety of which is incorporated by reference herein.

FIELD

The present disclosure relates generally to a method of removing entrained liquids from a gas stream. Specifically, demisting cyclones are located within a cross-section of a riser to remove the entrained liquids from the gas stream.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

In various production processes where a gas and a liquid come into contact, the gas may entrain some amount of liquid droplets. In many industrial processes, entrainment can cause process inefficiencies, product losses, and equipment damage. For example, in natural gas processing, entrained hydrocarbon liquids may promote foaming in gas treating towers such as glycol or amine contactors, thereby leading to operational upsets, which may result in shutdowns or increased operating expenses related to defoamer injection. Further, entrained hydrocarbon liquids can also reduce the purity of separated components in distillation columns. In cases where entrainment is severe, premature flooding of process equipment may occur. Even microscopic amounts of droplets, which may be difficult or impossible to detect visually, can have a significant impact on composition and heating value of natural gas. Accordingly, the entrained liquids may be contained and removed in an effort to produce a purified gas and to prevent potential process contamination or losses.

There are many technologies for removing entrained liquids. One existing method may include implementing a separate scrubbing vessel that can be included upstream of a gas treating absorber column or distillation column. The scrubber may contain demisting cyclones along with other droplet removing internal devices. However, the scrubbing vessel solution may lead to additional pressure drop in the vessel and associated instrumentation, thereby resulting in increased capital expenses.

Conventionally, demisting cyclones may be placed at the bottom of the column on a deck where vapor may be introduced. Above the deck, a liquid draw-off or collector tray containing risers may be utilized so that vapor may pass through the column. The spacing between the demisting cyclones and the collector tray may require additional height versus a separate stand-alone column and thus, occupying additional spacing within the column.

The MKS Multi Cassette™ from Sulzer and the Swirltube™ from Shell are other alternate technologies that may be used for cyclonic de-entrainment decks. However, both methods may not allow for countercurrent vapor-liquid segregation, as does a traditional collector tray, and where the cyclonic mechanism is located incorporated within a chimney on the collector tray.

Generally, the aforementioned technologies have focused on implementing stand-alone equipment or increasing the size of the equipment to reduce entrainment losses at elevated pressures. However, there is a need for a space-efficient column where entrained liquids can be efficiently captured and removed while maintaining operating pressure and controlling capital expenses.

SUMMARY

An exemplary embodiment described herein provides a method for removing entrained liquids. The method includes introducing a gas stream into an inlet of a column comprising a plurality of cyclones incorporated into risers, where the gas stream comprises entrained liquids. The method includes separating at least a portion of the entrained liquids from the gas stream using the plurality of cyclones. The method includes flowing the separated entrained liquids countercurrent to the flow of the gas stream and removing the separated entrained liquids through a bottom outlet of the column. The method also includes removing the gas stream through a top outlet of the column.

Another exemplary embodiment provides a system for removing entrained liquids. The system includes a gas stream including entrained liquids and a plurality of cyclones configured to separate the gas stream from the entrained liquids, where the plurality of cyclones are located in risers. The system includes a drain line configured to flow the separated entrained liquids from the gas stream. The system includes a top outlet configured to remove the gas stream from the system and a bottom outlet configured to remove the separated entrained liquid from the system.

Another exemplary embodiment provides a method for removing entrained liquid hydrocarbons in a countercurrent contact separator to produce a lean hydrocarbons gas. The method includes introducing a gas stream into an inlet of the countercurrent contact separator and flowing the gas stream through a bulk separator to capture a portion of the entrained liquid hydrocarbons. The method includes flowing the gas stream through a plurality of cyclone bundles, where the plurality of cyclone bundles are located in risers to capture a remaining fraction of the entrained liquid hydrocarbons. The method includes flowing the captured entrained liquids downward into a drain line countercurrent to the gas stream. The method includes removing the captured entrained liquids through a bottom outlet of the countercurrent contact separator. The method includes removing the lean hydrocarbons gas through a top outlet of the countercurrent contact separator.

DESCRIPTION OF THE DRAWINGS

The advantages of the present techniques are better understood by referring to the following detailed description and the attached drawings, in which.

DETAILED DESCRIPTION

Figure 1:
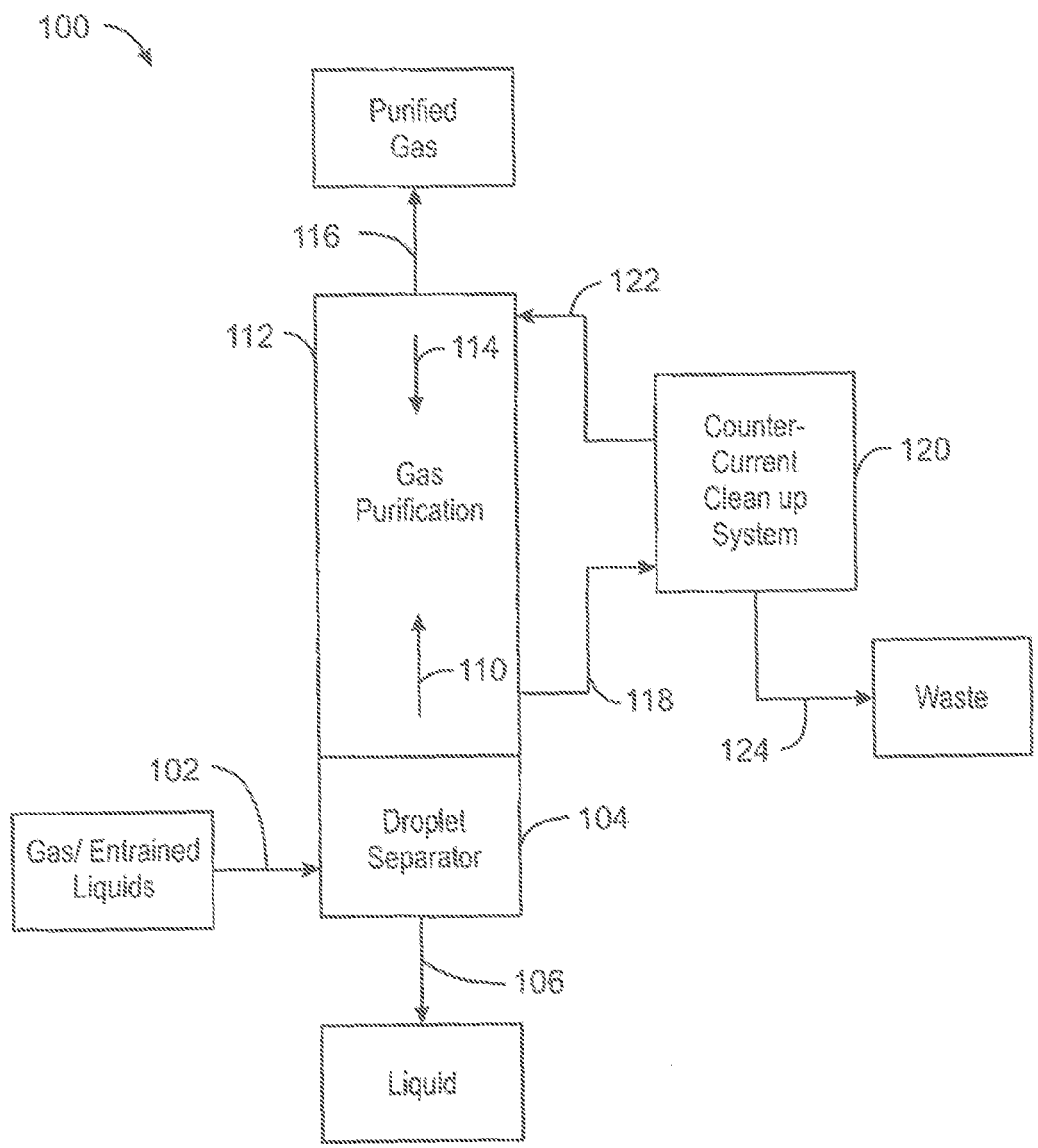
FIG. 1 is a block diagram of a column configured for the separation of entrained liquids from a gas and the purification of the gas.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

Embodiments of the present invention provide a system and methods for removing entrained liquids from a gas stream. A number of demisting cyclones may be incorporated within risers in a column to separate and remove the entrained liquids from the gas stream. Drain lines in the column may provide a conduit to flow the separated entrained liquids through the column and a bottom outlet line may be configured to remove the separated entrained liquids from the column.

A gas stream may contain varying concentration of contaminants and impurities that can affect the quality and purity of the gas. For example, produced natural gas may contain varying quantities of higher molecular weight hydrocarbons (HMHCs), e.g., $C_2$ through $C_5$, and other constituents that contribute little to no heating value. Depending upon the concentrations present, the gas may require treatment to reduce these constituents, which may include water, carbon dioxide, nitrogen, oxygen, sulfur, and acid gases. Additionally, the HMHCs and other constituents may also condense to form entrained droplets of liquid from the produced natural gas if the temperature is decreased. For example, water vapor in the produced natural gas may condense to produce water during a gas temperature drop. As the entrained liquids may cause foaming or other problems during separation, devices to capture the droplets may be useful. Such devices may be located upstream of compressors, turbines, burners, and other equipment susceptible to liquid damage to protect such downstream facilities.

One technique for liquid capture and removal includes utilizing demisting cyclones in an individual vessel to separate and remove the entrained liquids, in the form of droplets or to "de-mist" a gas stream. The demisting cyclones may provide high efficiency at high operating pressures and reduce foaming and fouling in the vessel. Generally, the demisting cyclones implement centrifugal, gravitational, and inertial forces to remove the entrained liquids, in the form of droplets, from the gas stream. In operation, the gas stream is subjected to rotational motion imposing a centripetal force on the entrained liquid droplets, which may be transported to the walls of the cyclone, resulting in their separation from the gaseous mixture. Using the demisting cyclones for liquid removal may aid in protecting downstream equipment, reducing liquid carry-over, and preventing environmental pollution.

FIG. 1 is a block diagram of a column configured for the separation of entrained liquids from a gas and the purification of the gas. A gas stream 102 can be introduced into a droplet separation section 104 of a column 100 so that entrained liquid droplets may be separated from the gas stream 102. As described herein, when the gas stream 102 enters the column 100, it may be subjected to centrifugal forces in demisting cyclones located in the droplet separation section 104. In operation, the demisting cyclones may spin the gas stream 102 at a specified velocity to remove the entrained liquid droplets and any heavy particulate matter within the stream 102. Due to gravitational forces, a waste stream 106 formed from the entrained liquid droplets and any heavy particulate matter may flow downward and out of the column 100.

After the entrained liquid droplets are separated and removed, a gas stream 110 may continue upward into a gas purification section 112 of the column 100. The gas stream 110 may come into countercurrent contact with an absorption solvent 114 utilized to purify the gas stream 110 by removing impurities by the process of chemical absorption. The impurities in the gas stream 110 may be absorbed by the absorption solvent 114 to form a purified gas stream 116 that may exit through an overhead outlet of the column 100. The purified gas stream 116 may be a dry gas or a sweet gas that can be fed to another separation section to collect any entrained liquid solvent in the gas phase and thereon to either a pipeline system or to a gas plant.

As the adsorption solvent 114 falls through the column 100, the solvent 114 may absorb at least a portion of the impurities in the gas stream 110 so that a rich solvent stream 118 may be formed. The rich solvent stream 118 may exit the column 100 and flow into a counter-current clean-up system 120. The clean-up system 120 can be implemented to heat the rich solvent stream 118 to separate and remove the absorbed impurities to form a lean solvent stream or a lean solvent fluid 122, which may be recycled back into the column 100 for additional absorption of impurities. The absorbed impurities may exit the system 120 as a waste stream 124.

Figure 2:
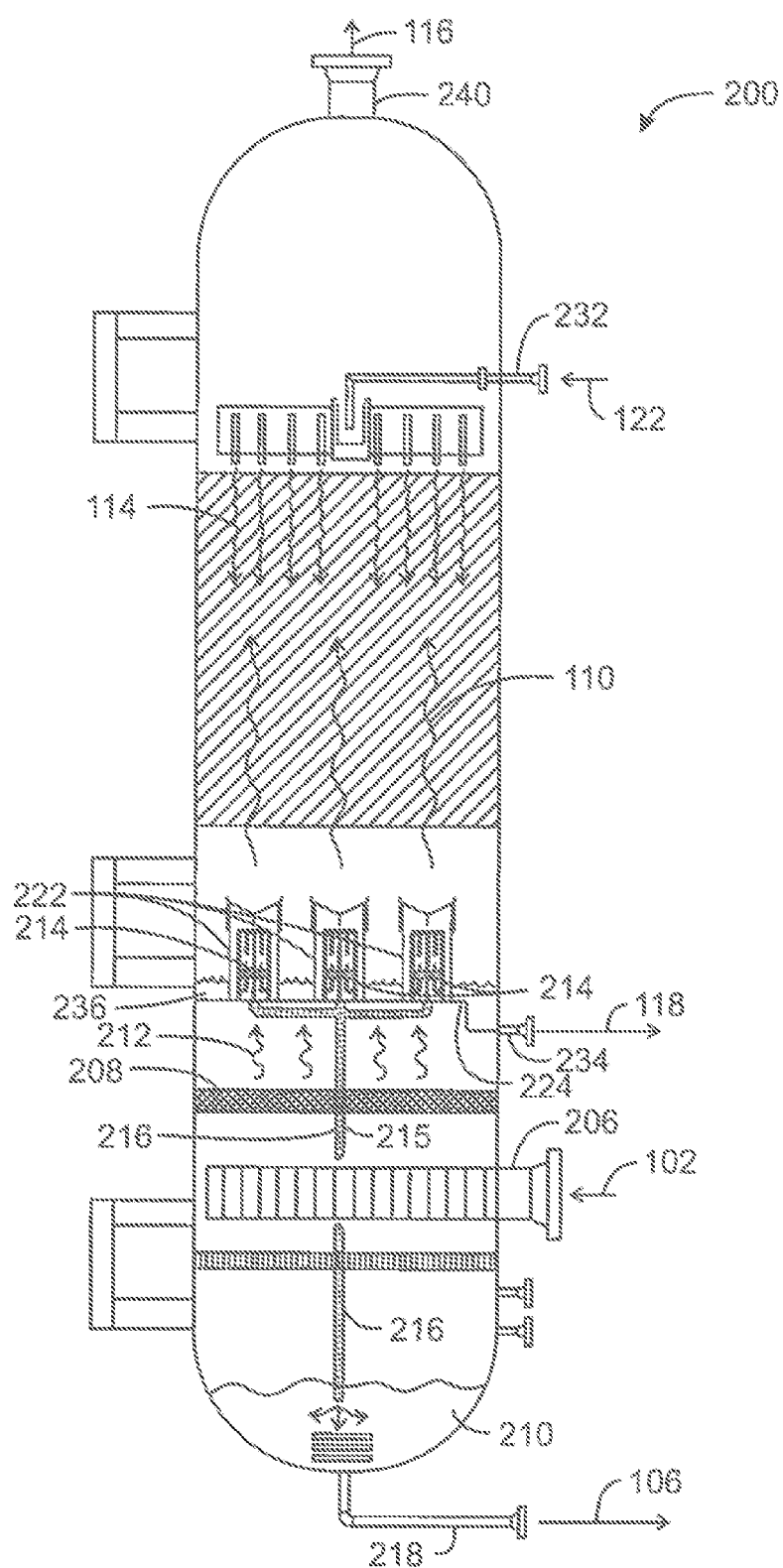
FIG. 2 is an illustration of a counter-current contactor column with an integral separator with demisting cyclones for the removal of entrained liquids from a gas.

FIG. 2 is an illustration of a counter-current contactor column with an integral separator with demisting cyclones for the removal of entrained liquids from a gas. A gas inlet stream 102, including entrained liquids, may be introduced into a column 200, which may include at least one vapor inlet 206 for the introduction of the stream 102. The inlet gas stream 102 may contact a bulk separator 208 as a means of separating at least a portion of the entrained liquids and solids from the inlet gas stream 102. The relatively short distance between the inlet gas stream 102 and the bulk separator 208 may provide a shorter contact time between the gas and the entrained particles. In some embodiments, the separator 208 may also be a coalescer in which fine droplets are coalesced into larger droplets making it easier for the cyclones to collect. The entrained liquids collected by the bulk separator 208 may include liquids in the form of droplets. The droplets may fall into a liquid reservoir 210 located at a bottom portion of the column 200 due to gravitational forces.

A stream of gas and entrained liquid droplets 212 may continue upward in the column 200 where the droplets may enter into a number of cyclones 214. As the mechanism for separating and removing the entrained liquids from the inlet gas stream 102, the demisting cyclones 214 may be packaged in the form of bundles including at least several demisting cyclones 214 to a cyclone bundle. In hydrocarbon production, demisting cyclones 214 may be utilized to replace larger and more expensive types of separators. Based on particles size, the demisting cyclones 214 may be capable of removing at least 99% of the entrained liquids droplets.

As the stream of gas and entrained liquid droplets 212 enters into the demisting cyclones 214, the droplets 212 may coalesce into larger droplets of entrained liquids where the surface tension between the colliding droplets may be the driving force for the coalescence. In operation, the entrained droplets may be centrifuged to the wall of the demisting cyclone 214 where the droplets can merge with a liquid film on the walls of the demisting cyclone 214. The liquid film may exit the demisting cyclones 214 for collection and drainage through the drain lines 216. After removal from the stream of gas and entrained liquid droplets 212, a de-entrained liquid stream 215 may flow through the drain lines 216, and collect into the liquid reservoir 210. A bottom outlet 218 may remove the waste stream 106, e.g., the collected de-entrained liquids, from the column 200.

The de-entrainment mechanism to remove the entrained liquid droplets in the stream of gas and entrained liquid droplets 212 can include risers 222 located on the collector tray 224. The risers 222 can be defined by riser walls that may originate at the collector tray 224 so that a bottom of each riser 222 may be flush with the collector tray 224. The demisting cyclones 214 may be located within each riser 222.

By placing the demisting cyclones 214 inside of the risers 222, the area at the bottom of the risers 222 may be flush with the collector tray 224 and sealed off to prevent the gas stream 102 from bypassing the cyclones 214. Additionally, with the demisting cyclones 214 located within the risers 222, the need to install choke plates in the cross-sectional area of the risers 222 can be eliminated. This may be due in part to an inherent pressure drop associated with the cyclones 214 that may aid in distributing vapor rising from the collector tray 224 to a gas polishing section located in an upper portion of the column 200.

Since the demisting cyclones 214 may be located in the risers 222, spacing between the cyclones 214 and a bottom of a collection tray 224 that may have been previously required by a conventional liquid/gas separation technique can be eliminated, thus providing additional spacing for other uses within the column. Moreover, compression of the de-entrainment mechanisms provides additional space in the column, thereby leading to a more lightweight and compact column. In turn, compact columns may be less vulnerable to movement thereby reducing larger inertial loads on the entire structure and potential losses due to reduced efficiency. This may also contribute to cost efficiency and weight capacities, especially with process vessels with thicker shells and with offshore installations.

A gas stream 110 flows from the demisting cyclones 214 and upward into the column 200. The gas stream 110 can be purified by a lean solvent fluid 122, falling from the top of the column that removes impurities and contaminants remaining in the gas stream 110. The lean solvent fluid 122 may enter the column 200 via a solvent inlet 232 and flow downward into the column 200 where it may come into contact with the rising gaseous mixture 110. For example, the lean solvent fluid 122 may be a triethylene glycol (TEG) stream, for removing water vapor from the gas stream 110, or any other type of solvent for the removal of containments. A collector tray 224 may be utilized to collect a pool of the rich solvent fluid 236 as a collection means to prevent the lean solvent fluid 122 from flowing past the risers 222 and into the lower portion of the column 200.

The pooled rich solvent fluid 236 may be removed from the column 200 through a liquid draw 234 as a rich solvent stream 118. After the contact with the lean solvent fluid 122, a dry gas product or purified gas stream 116 may be removed from the column 200 through an overhead outlet 240 for further processing or commercialization. The purified gas stream 116 may contain at least about 0.01% to 20% entrained liquids or at least about 0.1% to 30% entrained liquids.

Figure 3A:
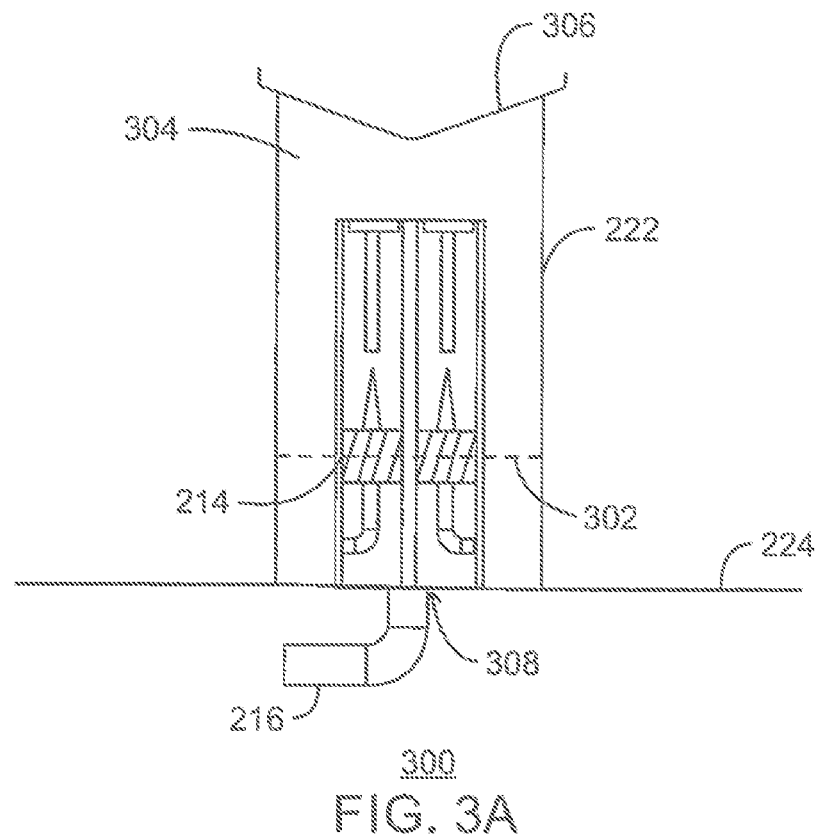
FIG. 3A is an illustration of a side view of a demisting cyclone located in a cross-sectional area of a riser.

FIG. 3A is an illustration of a side view of a demisting cyclone 214 located in a cross-sectional area 302 of a riser 222. Similar item numbers for FIG. 3A are as described with respect to FIG. 2. The demisting cyclone 214 has an inlet that functions as a conduit for a gas stream containing entrained liquids and the outlet may be a conduit for a dry gas product. Additionally, the demisting cyclone 214 may include cylindrical tubes with a rotating device so that an inlet gas stream may undergo centrifugal forces to cause the entrained liquids to be separate out of the inlet gas stream.

As the entrained liquids are subjected to the centrifugal forces within the demisting cyclone 214, the entrained liquid droplets are removed from the gas stream as a liquid stream, through a drain line 216. Perforations in the demisting cyclone 214 may allow the separated gas to flow out from the cyclone tube into a closed chamber 304 of the riser 222. A number of demisting cyclones 214 can share a common closed chamber 304 for the accumulation of the entrained liquids. Each riser 222 may also include a riser hat 306, which can be positioned over the top of the riser 222. It should be noted that the riser 222 and the riser hat 306 can be of any particular shape, including round, square, rectangular, triangular, to prevent liquids, such as a separation fluid, from dropping into the riser 222 which is located above. The closed chamber 304 may also aid in preventing any re-entrained liquid droplets from proceeding further into the column. An opening 308, located at a bottom of the collector tray 224, may accommodate the drain line 216 to direct the de-entrained liquid droplets into a reservoir located at the bottom of the column. In some embodiments, a drain hole may be located at the bottom of the closed chamber 304 of the riser 222 for additional drainage of associated liquids within the riser 222.

Figure 3B:
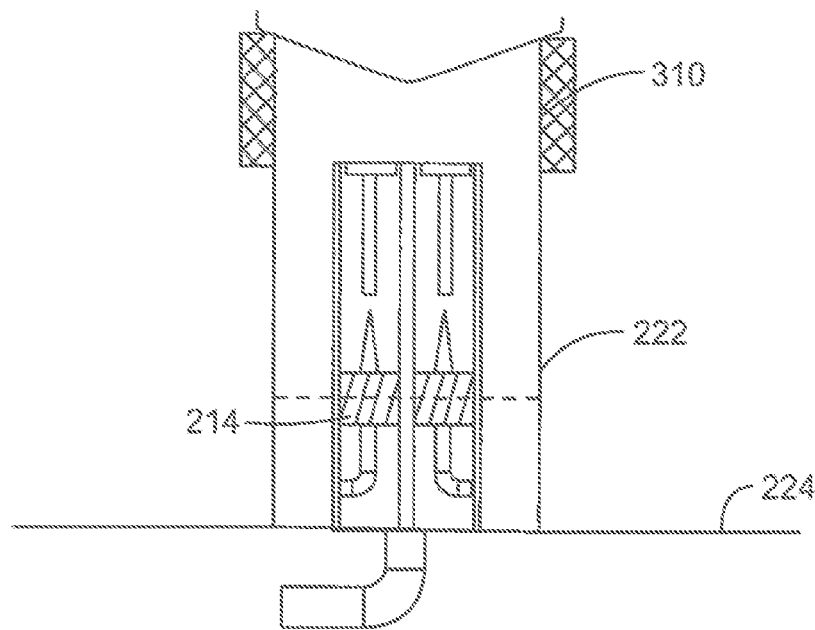
FIG. 3B is an illustration of a side view of a demisting cyclone located within a cross-sectional area of a riser including meshing.

FIG. 3B is an illustration of a side view of a demisting cyclone located within a cross-sectional area of a riser including meshing. Similar item numbers for FIG. 3A may be used in respect to FIG. 2. FIG. 3B is a detailed view of a riser 222 including a demisting cyclone 214 located within a cross-sectional area of the riser 222 where meshing 310 may be utilized to remove any remaining entrained droplets of liquids remaining after being subjected to the cyclone 214. The meshing 310 may include a pad of knitted wire meshing supported by a framework that may act as a secondary polishing unit. This secondary polishing unit can be any de-entrainment device including vane packs, packing, or any similar device thereof. In operation, as the entrained liquid droplets are subjected to rapid rotation within the demisting cyclone 214, re-entrained liquid droplets may also then be impinged onto a surface of the meshing 310, as well as on the side wall surfaces of the cyclone 214. Subsequently, the liquid droplets, which may include larger droplets, may collect and coalesce on the surface of the meshing 310 and fall due to gravitational forces into a bottom portion of a column. Smaller liquid droplets may flow around the meshing 310 and continue to flow upward with a gaseous mixture that may continue upward into a column. When used in conjunction with meshing 310, the demisting cyclone 214 may achieve a higher turndown and higher separation efficiency.

As shown in FIG. 3B, the meshing 310 may be located on windows of the riser 222 to assure complete coverage of the areas where a gaseous mixture may flow upward into a column. Additionally, the meshing 310 may eliminate the possibility of any gaps between risers 214 where liquid droplets may carryover. In some embodiments, the meshing 310 may be located above the demisting cyclone 214 or above both the demisting cyclone 214 and on windows of the riser. Additionally, in place of meshing, a vane pack or packing may be used to aid in liquid and gas separation.

It should be noted that in some embodiments, the riser 222 may be eliminated and the demisting cyclone 214, in bundle form, may act as the riser. A hat above the bundle may be required so that any collected liquid can drain out of the cyclone 214 without re-contacting any downward liquid leaving the upper portion of the column.

Figure 4:
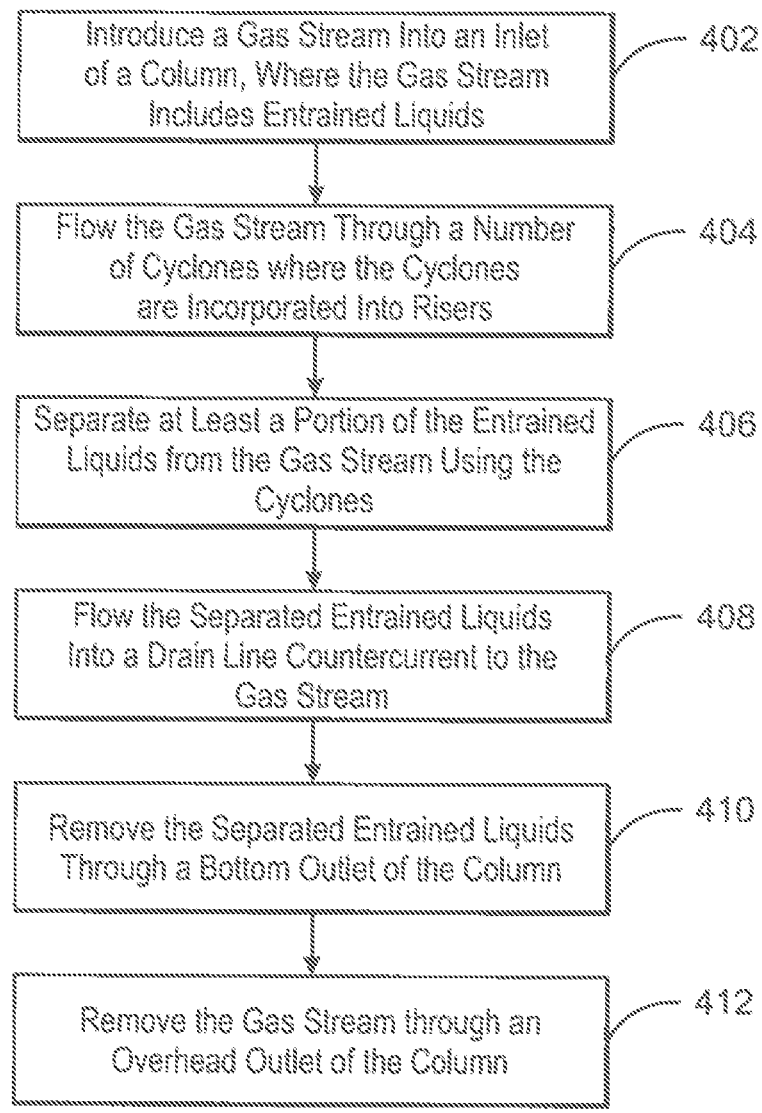
FIG. 4 is a process diagram of a method of removing entrained liquids.

FIG. 4 is a process diagram of a method 400 of removing entrained liquids from a gas stream. The method 400 begins at block 402 where a gas stream may be introduced into an inlet of a column, where the gas stream includes entrained liquids. It should be noted that the gas stream may be measured to determine the volume of entrained liquids using density and viscosity measurements, radioactive tracers, sound wave techniques, or fluid compressibility/expansibility tests. At block 404, the gas stream may flow through a number of cyclones, wherein the cyclones are incorporated into risers. The cyclones may be utilized in oil refineries, natural gas processing, chemical processing, gas pipelines, compressor systems, among others, to remove entrained liquids from a gas phase. At block 406, the entrained liquids may be separated from the gas stream using the cyclones. At block 408, the separated entrained liquids may flow countercurrent to a gas stream and into a drain line. At block 410, the separated entrained liquids may be removed through a bottom outlet of the column. At block 412, the gas stream may be removed through an overhead outlet of the column.

Figure 5:
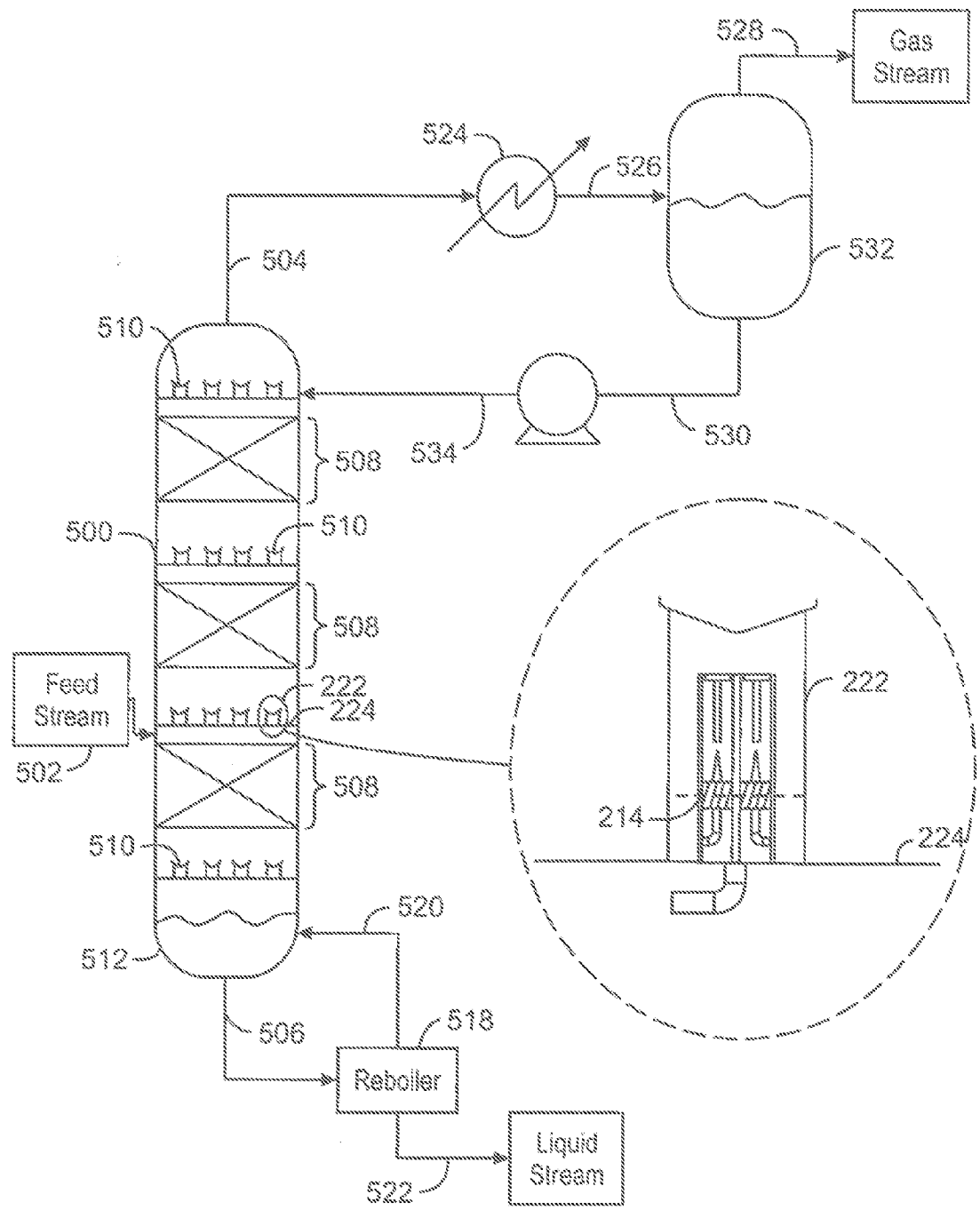
FIG. 5 is an illustration of a packed distillation column including demisting cyclones incorporated into risers.

FIG. 5 is an illustration of a packed distillation column 500 including demisting cyclones incorporated into risers. Similar item numbers for FIG. 5 may be used in respect to FIG. 2. A feed gas stream 502 may be injected into the column 500 to produce a gas product stream 504 and a de-entrained liquid stream 506. The feed gas stream 502 may include two or more different components with different boiling points and vapor pressures, such as entrained liquids and gas contaminants.

The feed gas stream 502 may be injected below risers 222 and flow into demisting cyclones 214 within the risers 222. Demisting cyclones 214 may be located inside of the risers 222, where the bottom portion of the risers 222 may be flushed with a collector tray 224 in order to prevent entrained liquids from bypassing the cyclones 214 and proceeding further into the column 500. In operation, small droplets of entrained liquids within the feed gas stream 502 may be subjected to centripetal forces within the demisting cyclone 214 and may coalesce into larger droplets that may be unable to flow upwards into the column 500. The larger droplets of entrained liquids may fall due to gravitational forces onto the collector tray 224. The gas within the feed stream 502 may continue upwards through the column 500 through packed beds 508 and additional risers 510. The packed beds 508 may be used to enhance contact between the gas and liquid phases of the feed stream 502 as the liquid phase may be separated from the gas phase as droplets. The additional risers 510 may or may not incorporate demisting cyclones 214 within their cross-sectional areas. Additional risers 510 in the column may be deemed as useful during revamp of a column for additional capacity.

The component that concentrates in the gas phase may be flowed out of the top of the column 500 as the overhead gas stream 504, while the component that concentrates in the liquid phase may be flowed out of the bottom of the column 500 as the de-entrained liquid stream 506. In addition, some amount of liquids 512 may be allowed to collect in the bottom of the column 500 before being flowed out of the column 500 in order to provide for increased separation of the gas phase from the liquid phase.

The de-entrained liquid stream 506 may be flowed through a reboiler 518. The reboiler 518 may increase the temperature of the de-entrained liquid stream 506 by vaporizing a portion of the stream 506 to form a vaporized liquid stream 520 and a liquid stream 522. The stream 520 may flow back into the bottom portion of the column 500 to provide heat to the liquids 512 collecting in the bottom of the column 500. It may prove useful to also have additional risers located between the reboiler inlet and a packed bed 508. This configuration may provide vapor distribution and may remove any possible liquid re-entrainment from the reboiler liquids.

The overhead gas stream 504 may be cooled and at least partially condensed within a heat exchanger 524. The cooled gas stream 526 may then be separated into a gas product stream 528 and a liquid stream 530 within a separation column 532. The liquid stream 530 may be flowed back into the top portion of the column 500 as a reflux stream 534. Within the column 500, the reflux stream 534 may be used to enhance the performance of the column 500 by increasing the degree of separation between the liquid phase and the gas phase. In addition, any liquid that may proceeded upward into the column 500 may be re-injected into the top portion of the column 500 as a reflux stream.

The column 500 may utilize a variety of other separation technologies, depending on the species in the feed stream 502. For example, the column may be a countercurrent separation column, a knock-out vessel, or a regeneration column, among others.

Since demisting cyclones of the present invention may be located in risers, spacing between the cyclones and a bottom of a collection tray can be eliminated. Thus, providing additional spacing for other uses within the column, thereby leading to a more lightweight and compact column. In turn, compact columns may be less vulnerable to movement thereby reducing larger inertial loads on the entire structure and potential losses due to reduced efficiency. This may also contribute to cost efficiency and weight capacities, especially with production vessels with thicker shells and with offshore installations.

While the present techniques may be susceptible to various modifications and alternative forms, the exemplary embodiments discussed above have been shown only by way of example. However, it should again be understood that the techniques is not intended to be limited to the particular embodiments disclosed herein. Indeed, the present techniques include all alternatives, modifications, and equivalents falling within the true spirit and scope of the appended claims.

What is claimed is:

1. A method for removing entrained liquids, comprising:
   introducing a gas stream into an inlet of a column comprising a plurality of cyclones incorporated into risers, wherein the gas stream comprises entrained liquids;

separating at least a portion of the entrained liquids from the gas stream using the plurality of cyclones;

flowing the separated entrained liquids countercurrent to the flow of the gas stream;

introducing a contact liquid into an inlet of the column;

removing the separated entrained liquids through a bottom outlet of the column; and removing the gas stream through a top outlet of the column.

2. The method of claim 1, wherein at least about 70% to 99.9% of the entrained liquids are separated from the gas stream.

3. The method of claim 1, comprising flowing the gas stream through a bulk separator to remove at least a portion of the entrained liquids before flowing the gas stream through the plurality of cyclones.

4. The method of claim 1, wherein separating at least a portion of the entrained liquids from the gas stream comprises implementing swirl tubes or a demisting cyclonic mechanism within the plurality of cyclones.

5. The method of claim 1, comprising placing wire meshing or other elements for de-entrainment above the plurality of cyclones, inside of the risers, in an open window of the risers, or any combination thereof.

6. The method of claim 1, wherein the gas stream contains about 0.1% to 30% of entrained liquids.

7. A method for removing entrained liquid hydrocarbons in a countercurrent contact separator to produce a lean hydrocarbons gas, comprising:

introducing a gas stream into an inlet of the countercurrent contact separator;

flowing the gas stream through a bulk separator to capture a portion of the entrained liquid hydrocarbons;

flowing the gas stream through a plurality of cyclone bundles, wherein the plurality of cyclone bundles are located in risers to capture a remaining fraction of the entrained liquid hydrocarbons;

flowing the captured entrained liquids downward into a drain line countercurrent to the gas stream;

introducing a contact liquid into an inlet of the column;

removing the captured entrained liquids through a bottom outlet of the countercurrent contact separator; and removing the lean hydrocarbons gas through a top outlet of the countercurrent contact separator.

8. The method of claim 7, wherein capturing the remaining fraction of the entrained liquid hydrocarbons comprises implementing swirl tubes or a demisting cyclonic mechanism within the plurality of cyclone bundles.

9. The method of claim 7, comprising flushing a bottom of each riser with a collector tray in an area excluding the cross-sectional area where the plurality of cyclone bundles are located.

10. The method of claim 7, comprising placing wire meshing above the plurality of cyclone bundles, inside of the risers, in an open window of the risers, or any combination thereof.

11. The method of claim 7, wherein the lean hydrocarbons gas contains about 0.1% to 30% of entrained liquids.

* * * * *